United States Patent
Kuwahara et al.

(10) Patent No.: US 8,835,596 B2
(45) Date of Patent: Sep. 16, 2014

(54) METHOD FOR PRODUCING POLYAMIDE

(75) Inventors: Hisayuki Kuwahara, Kanagawa (JP); Tomomichi Kanda, Niigata (JP); Shun Ogawa, Kanagawa (JP); Shinichi Ayuba, Kanagawa (JP); Kentaro Ishii, Kanagawa (JP); Takahiko Sumino, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 65 days.

(21) Appl. No.: 13/119,249

(22) PCT Filed: Sep. 11, 2009

(86) PCT No.: PCT/JP2009/065942
§ 371 (c)(1),
(2), (4) Date: Jun. 7, 2011

(87) PCT Pub. No.: WO2010/032692
PCT Pub. Date: Mar. 25, 2010

(65) Prior Publication Data
US 2011/0245454 A1    Oct. 6, 2011

(30) Foreign Application Priority Data
Sep. 18, 2008    (JP) .................................. 2008-239362

(51) Int. Cl.
*C08G 69/28*    (2006.01)

(52) U.S. Cl.
CPC ...................................... *C08G 69/28* (2013.01)
USPC ......................................................... 528/347

(58) Field of Classification Search
USPC ......................................................... 528/347
See application file for complete search history.

(56) References Cited

U.S. PATENT DOCUMENTS

| | | | |
|---|---|---|---|
| 2,130,947 A | 9/1938 | Carothers | |
| 2,214,442 A | 9/1940 | Spanagel | |
| 2,245,129 A | 6/1941 | Greenewalt | |
| 3,652,509 A * | 3/1972 | Tsuda | 528/339 |
| 2,174,527 A | 10/1989 | Peterson | |
| 5,416,189 A | 5/1995 | Vandevijver et al. | |
| 5,587,447 A | 12/1996 | Harada et al. | |

FOREIGN PATENT DOCUMENTS

| | | | |
|---|---|---|---|
| CN | 101208390 A | | 6/2008 |
| JP | 47 15106 | | 5/1972 |
| JP | 5 170897 | | 7/1993 |
| JP | 6 192416 | | 7/1994 |
| JP | 6 207004 | | 7/1994 |
| JP | 7 324130 | | 12/1995 |
| JP | 8 259691 | | 10/1996 |
| JP | 10 292042 | | 11/1998 |
| JP | 2003026797 A | * | 1/2003 |
| JP | 2003327691 A | * | 11/2003 |
| WO | WO 2007/048728 A1 | | 5/2007 |

OTHER PUBLICATIONS

Biesenberger et al (A fundamental study of polymer melt devolatilization. Part I: Some experiments on foam-enhanced devolatilization, Polymer Engineering and Science, 1986, vol. 26, No. 14, pp. 982-988).*
U.S. Appl. No. 13/395,535, filed Mar. 12, 2012, Ogawa, et al.
U.S. Appl. No. 13/395,541, filed Mar. 12, 2012, Ishii, et al.
U.S. Appl. No. 13/119,262, filed May 31, 2011, Kanda, et al.
U.S. Appl. No. 13/391,075, filed Feb. 17, 2012, Ishii, et al.
U.S. Appl. No. 13/322,499, filed Nov. 25, 2011, Ogawa, et al.
U.S. Appl. No. 13/322,519, filed Nov. 25, 2011, Ogawa, et al.
Fukumoto, O., "Polyamide-jushi Handbook," The Nikkan Kogyo Shinbun, Ltd., pp. 410-413, (Jan. 30, 1988).
International Search Report issued Nov. 17, 2009 in PCT/JP09/065942 filed Sep. 11, 2009.
Combined Taiwanese Office Action and Search Report issued Feb. 13, 2014, in Taiwanese Patent Application No. 098131150 with English translation of category of cited documents.

* cited by examiner

*Primary Examiner* — Randy Gulakowski
*Assistant Examiner* — Rachel Kahn
(74) *Attorney, Agent, or Firm* — Oblon, Spivak, McClelland, Maier & Neustadt, L.L.P.

(57) ABSTRACT

A method of producing polyamide by the direct polycondensation of a diamine component and a dicarboxylic acid component without using a solvent, such as water. The diamine component containing 70 mol % or more of p-xylylenediamine is added to a reaction system containing the dicarboxylic acid component under pressure while maintaining the reaction system in a molten state. After the addition of the diamine component, the pressure of the reaction system is reduced to atmospheric pressure over 50 min or more at a pressure falling speed of 1.0 MPa/h or less. By the production method, polyamide with a small molecular weight dispersion is easily produced.

17 Claims, No Drawings

METHOD FOR PRODUCING POLYAMIDE

This application is a 371 of PCT/JP2009/065942 filed Sep. 11, 2009. Priority to Japanese patent application 2008-239362, filed Sep. 18, 2008, is claimed.

TECHNICAL FIELD

The present invention relates to a method for producing polyamide by the direct polycondensation of a diamine component containing 70 mol % or more of p-xylylenediamine and a dicarboxylic acid component containing 70 mol % or more of an aliphatic dicarboxylic acid having 6 to 18 carbon atoms.

BACKGROUND ART

Generally, in the production of polyamide from a dicarboxylic acid and a diamine, an aqueous solution of a slat of a dicarboxylic acid and a diamine (so-called nylon salt) is subjected to polycondensation by keeping the temperature at a polyamide-forming temperature while distilling off water (solvent) under pressure. This production method requires a large amount of heat for removing the water used as the solvent from the reaction system and an extremely long reaction time. In addition, the yield of polyamide in each batch reaction is small, being poor economy. Further, since the top surface of the liquid moves largely during the reaction, the polymer adheres to the inner wall of the reaction vessel. The adhered polymer is partially overheated to be likely degraded. Therefore, many disadvantages remain in the production of products with uniform and good quality by conventionally known methods.

To eliminate these disadvantages, Patent Documents 1 and 2 propose a direct polymerization of a nylon salt of a dicarboxylic acid and a diamine in an inert atmosphere. However, the proposed method cannot be an efficient method, because an additional process of isolating and purifying the nylon salt is required. Patent Document 3 proposes to directly mix a diamine and a dicarboxylic acid and then polycondensate the mixture under pressure. However, this method needs an expensive horizontal agitation reactor. Patent Document 4 proposes to mix a molten diamine containing 2 to 30% by weight of water with a molten dicarboxylic acid and polycondensate the mixture under atmospheric pressure at 220° C. or lower. However, this method cannot be an efficient method as compared with the direct polymerization of a diamine and a dicarboxylic acid without using water as the solvent, because the removal of water by distillation requires time and heat.

Patent Documents 5 and 6 propose a direct polycondensation of a diamine and a dicarboxylic acid under atmospheric pressure without using a solvent. In the proposed method, polyamide is obtained by adding a diamine to a molten dicarboxylic acid while raising the temperature of reaction system and finally continuing the melt-polymerization at a temperature equal to or higher than the melting point of polymer. However, if the boiling point of the diamine component is lower than the melting point of the polymer being produced, the added diamine component is evaporated and a large amount of the diamine component is distilled out of the reaction system. Therefore, the molar ratio (diamine/dicarboxylic acid) of the polyamide produced is extremely lower than 1, to make it difficult to obtain polyamide having an intended molecular weight. If the boiling point of the diamine component is lower than the melting point of the polyamide being produced, the amount of the diamine being distilled out of the reaction system can be reduced by using a partial condenser. However, the temperature of reaction system is lowered by a large amount of the diamine returning from the partial condenser to the reaction system. Therefore, an additional amount of heat is required to maintain the reaction system at a polyamide-forming temperature, this making the efficiency of the method poor.

Patent Document 7 proposes a method of producing polyamide by the direct polycondensation of a diamine and a carboxylic acid under pressure. In the proposed method, the production of polyamide is conducted at temperature higher than the boiling point of the diamine by pressurizing the reaction system. In the proposed method, the diamine is added dropwise in two stages, and the escape of the diamine component from the reaction system by distillation at the latter stage of the reaction is prevented by slowing down the dropwise addition in the second stage. However, the change of the dropping speed in the course of the synthesis makes the operation complicated. In addition, since it is not clear how the dropping speed in the second stage is determined, the proposed method still involves the drawback that the diamine is distilled out of the reaction system and the molar ratio (diamine/dicarboxylic acid) of the polyamide being produced is extremely lower than 1.

Patent Document 1: JP 35-15700B
Patent Document 2: JP43-22874B
Patent Document 3: US 2,840,547
Patent Document 4: JP48-12390A
Patent Document 5: JP58-111829A
Patent Document 6: JP1-14925B
Patent Document 7: JP2003-327691A

DISCLOSURE OF THE INVENTION

An object of the invention is to solve the above problems in prior art and provide a simple production method of polyamide by the direct polycondensation of a diamine component containing 70 mol % or more of p-xylylenediamine and a dicarboxylic acid component without using a solvent, such as water.

As a result of extensive research on the method of economically producing polyamide in a short time by the direct polycondensation of a diamine component and a dicarboxylic acid component, the inventors have found that the polyamide is easily produced by adding the diamine component to a molten dicarboxylic acid component while maintaining the reaction system in a molten state under pressure and reducing the pressure to atmospheric pressure after the addition of the diamine component.

Namely, the present invention relates to a method of producing polyamide by a direct polycondensation of a diamine component and a dicarboxylic acid component, which includes a step of adding a diamine component containing 70 mol % or more of p-xylylenediamine to a dicarboxylic acid component containing 70 mol % or more of straight-chain aliphatic dicarboxylic acid which is maintained in a molten state by heating to a melting point thereof or higher while maintaining a reaction mixture in a molten state under pressure; and a step of reducing a pressure of the reaction system to atmospheric pressure over 50 min or longer at a pressure falling speed of 1.0 MPa/h or less after the addition of the diamine component.

The production method of polyamide of the present invention has the following effects.
(1) Since an aqueous solution of nylon salt is not used as the starting material, a step of removing water used as a solvent is not required and the reaction time is extremely shortened.

(2) Since water is not used as a solvent, the amount of initial charge and the yield can be increased.
(3) Since an aqueous solution of nylon salt is not used as the starting material, the foaming and solidification of polyamide which may be caused during the removal of a large amount of water are prevented, and the energy required for removing water used as a solvent is saved.
(4) Since the molar balance of initial charge is exactly reproduced in the polyamide produced, the control of molar balance, i.e., the control of the degree of polymerization is extremely easy.
(5) Since an aqueous solution of nylon salt is not used as the starting material, the reaction vessel to be used can be less pressure-resistant as compared with the reaction vessel conventionally used in the pressurized melt polymerization.
(6) Since the addition speed of the diamine is not needed to be changed in two stages and can be maintained constant, the apparatus and the operation are simple.

BEST MODE FOR CARRYING OUT THE INVENTION

The dicarboxylic acid component used as the starting material in the invention contains at least one kind of straight-chain aliphatic dicarboxylic acid having 6 to 18 carbon atoms in an amount of 70 mol % or more, preferably 80 mol % or more, and still more preferably 90 mol % or more (each inclusive of 100%). The straight-chain aliphatic dicarboxylic acid having 6 to 18 carbon atoms may be at least one kind of dicarboxylic acids selected from the straight-chain aliphatic α,ω-dicarboxylic acids, such as adipic acid, pimelic acid, suberic acid, azelaic acid, sebacic acid, undecanedioic acid, and dodecanedioic acid, with at least one of adipic acid, azelaic acid, sebacic acid, undecanedioic acid, and dodecanedioic acid being preferred, at least one of adipic acid, azelaic acid, and sebacic acid being more preferred, and sebacic acid being still more preferred.

Another dicarboxylic acid usable in an amount of less than 30 mol % may include straight-chain aliphatic α, ω-dicarboxylic acid having 5 or less carbon atoms, such as succinic acid and glutaric acid; aromatic dicarboxylic acid, such as terephthalic acid, isophthalic acid, 2,6-naphthalenedicarboxylic acid, and 4,4'-biphenyldicarboxylic acid; and alicyclic dicarboxylic acid, such as 1,4-cyclohexanedicarboxylic acid, 1,3-cyclohexanedicarboxylic acid, decalindicarboxylic acid, and tetralindicarboxylic acid.

The diamine component used as the starting material in the invention contains p-xylylenediamine in an amount preferably 70 mol % or more, more preferably 80 mol % or more, and still more preferably 90 mol % or more (each inclusive of 100%). The diamine other than p-xylylenediamine usable in an amount of less than 30 mol % may be at least one kind of diamine selected from the group consisting of aliphatic diamine, such as tetramethylenediamine, pentamethylenediamine, hexamethylenediamine, octamethylenediamine, and nonamethylenediamine; diamine having aromatic ring, such as p-phenylenediamine and m-xylylenediamine; and alicyclic diamine, such as 1,3-bis(aminomethyl)cyclohexane and 1,4-bis(aminomethyl)cyclohexane.

Before the polycondensation, the dicarboxylic acid component is charged in a reaction vessel and kept in a molten state therein. A solid dicarboxylic acid component may be charged in a reaction vessel and then made into a molten state by heating to its melting point or higher. Alternatively, a molten dicarboxylic acid component may be charged in a reaction vessel.

The dicarboxylic acid component is made into a molten state when heated to its melting point or higher and the polycondensation can be initiated by adding the diamine component. For the substantial proceeding of the amidation, the temperature of the reaction system is raised to preferably 160° C. or higher and more preferably 160 to 200° C. Still more preferably, the temperature is set so as to make the oligoamide and/or intermediate of polyamide into a molten state, thereby maintaining the whole reaction system in a uniform flowable state. The temperature to be set so as to maintain the whole reaction system in a uniform flowable state can be determined in advance by DSC analysis, etc. on a mixture of the dicarboxylic acid component and the diamine component in a given molar ratio.

To produce a less colored polyamide by the method of the invention, it is preferred to sufficiently replace the inner atmosphere of the reaction vessel with an inert gas before charging the dicarboxylic acid component into the reaction vessel. As mentioned above, a solid dicarboxylic acid component charged in a reaction vessel may be made into a molten state by heating to its melting point or higher, or alternatively, a molten dicarboxylic acid component may be charged into a reaction vessel. If a solid dicarboxylic acid component is molten in a reaction vessel, the inner atmosphere of the reaction vessel is preferably replaced with an inert gas before melting. If a molten dicarboxylic acid component is charged into a reaction vessel, the inner atmosphere of the reaction vessel is preferably replaced with an inert gas before charging.

The diamine component is added under pressure to the molten dicarboxylic acid component in a reaction vessel while stirring. During the addition of the diamine component, the reaction mixture is kept at a predetermined temperature so as to maintain it in a molten state. The diamine component is added to the molten dicarboxylic acid component either in a continuous manner or in an intermittent manner. During the addition, the reaction mixture is maintained in a molten state by sequentially raising the temperature of reaction mixture. The melting point of reaction mixture can be suitably confirmed by DSC measurement. The temperature of reaction mixture is preferably controlled within a range from the melting point of reaction mixture to the melting point of reaction mixture +20° C. If the temperature of reaction mixture is the melting point thereof or higher, the solidification of the reaction mixture in the reaction vessel is prevented. If the temperature of reaction mixture is the melting point thereof +20° C. or lower, the degradation of the reaction mixture is avoided. At the time the addition of the diamine component is completed, it is preferred to make the temperature of reaction mixture equal to or higher than the melting point of the polyamide being produced, while maintaining the reaction mixture in a molten state.

The addition speed of the diamine component is selected so as to keep the reaction system at a predetermined temperature, namely, a temperature sufficient for maintaining the reaction system in a uniform molten state, while considering the heat generation of amidation, the heat consumed for distilling off the water released by polycondensation, the heat supplied from a heating medium through the wall of reaction vessel, and the structure of a means for separating the water released by polycondensation and the stating materials (diamine component and dicarboxylic acid component). The addition speed is not needed to be changed in two stages in the present invention and may be constant. The time taken for adding the diamine component varies according to the size of the reaction vessel and is generally 0.5 to 5 h. In the course of the addition, the water released as the polycondensation proceeds is distilled out of the reaction system. The starting materials scattered or evaporated are separated from the water released by polycondensation and returned to the reaction system. A partial condenser is preferably used for the separation of the starting materials and the water released by polycondensation. The water released by polycondensation is distilled out of the reaction system preferably through a total condenser.

Since the melting point of the polyamide being produced is close to the boiling point of p-xylylenediamine under atmospheric pressure, the addition of the diamine component is conducted under pressure in the production method of the invention. The inner pressure of the reaction vessel during the addition of the diamine component is preferably set to a level under which the boiling point of p-xylylenediamine is higher than the melting point of the polyamide being produced by 20° C. or more, and more preferably set to a level under which the boiling point of p-xylylenediamine is higher than the melting point of the polyamide being produced by 20° C. or more and equal to or lower than 350° C. The pressure required varies depending upon the kind of dicarboxylic acid component to be used and the kind of the diamine component other than p-xylylenediamine to be optionally used, and is preferably 0.1 to 0.6 MPa and more preferably 0.2 to 0.5 MPa. The reaction vessel may be pressurized by an inert gas, such as nitrogen, or the water released during the polycondensation.

It is recommended to regulate the inner pressure of the reaction vessel within the above range after charging the dicarboxylic acid component into the reaction vessel and before the temperature of reaction system reaches (boiling point of the diamine component under atmospheric pressure) −10° C., preferably after charging the dicarboxylic acid component into the reaction vessel and before the temperature of reaction system reaches (boiling point of the diamine component under atmospheric pressure) −20° C. After regulating the inner pressure of the reaction vessel within the above range, the addition of the diamine component is started. By starting the addition of the diamine component when the inner pressure of the reaction vessel is 0.1 MPa or more and the temperature of reaction system is (boiling point of the diamine component under atmospheric pressure) −10° C. or less, the violent evaporation of the diamine component added dropwise is prevented, thereby further preventing the increase in the amount of the diamine component escaped from the reaction system. Therefore, the amount of the diamine component in the reaction system is not reduced and the polyamide having a desired molar ratio is obtained. The amount of the diamine component escaped from the reaction system can be also reduced by a partial condenser without controlling the addition of the diamine component as mentioned above. However, a large amount of the diamine component returned to the reaction system from a partial condenser reduces the temperature of the reaction system, this requiring an addition amount of heat for maintaining the reaction system in a molten state. Therefore, the method of utilizing only a partial condenser cannot be an efficient method.

In the present invention, the inner pressure of the reaction vessel is reduced to atmospheric pressure (preferably 0.095 to 0.107 MPa) after completing the addition of the diamine component. Although the interval from the completion of the addition to the start of pressure fall is not particularly limited, the pressure fall is preferably started within 30 min after the dropwise addition in view of shortening the time required for the production of polyamide. The pressure falling speed is selected so that the non-reacted diamine is not distilled out of the reaction system together with water during the pressure fall. Although depending upon the size of the reaction vessel and the pressure at the time the diamine component is added, the time taken from the completion of the dropwise addition to the end of pressure fall (the time when the pressure reaches atmospheric pressure) is preferably 50 min or more and more preferably 50 to 100 min. The pressure falling speed is recommended to be 1.0 MPa/h or less and preferably 0.1 to 1.0 MPa/h. If the pressure falling speed is more than 1.0 MPa/h or the pressure is reduced to atmospheric pressure within less than 50 min after the completion of the addition, the non-reacted diamine component is distilled out of the reaction system to make it difficult to produce polyamide having a uniform molecular weight in a good reproducibility. A pressure falling speed of less than 0.1 MPa/h is not preferred, because longer time is required to produce polyamide and the polyamide being produced is thermally degraded because of a longer pressure falling time.

The polycondensation may be terminated at the time the pressure falls to atmospheric pressure or may be terminated after continuing the polycondensation for a predetermined period of time under atmospheric pressure and/or reduced pressure. The polycondensation may be continued preferably within 120 min at a temperature not solidifying the polyamide being produced, for example, from the melting point of the polyamide being produced to the melting point +30° C.

Like the known aqueous solution method under pressure, the escape and scattering of the components in the reaction mixture, particularly the diamine component, into the outside of the reaction system cannot be completely prevented also in the production method of the invention. Therefore, the reaction apparatus for the polycondensation is preferably equipped with a partial condenser. The temperature of partial condenser is preferably from the boiling point of water under the inner pressure of the reaction vessel which is controlled constant to the boiling point +50° C. By the partial condenser, the components of the reaction mixture, particularly the diamine component, is effectively prevented from distilling out of the reaction system during the reaction, thereby allowing the molar balance of initial charge to be exactly reproduced in the molar balance of the polyamide. Therefore, the degree of polymerization is extremely easily controlled to allow the production of the polyamide having a similar molecular weight. When a polyamide having a high molecular weight is produced by the production method of the invention while regulating the molar ratio of the diamine component to the dicarboxylic acid component to nearly 1, preferably within 0.990 to 1.010, a polyamide with a small molecular weight dispersion.

EXAMPLES

The present invention will be described in more detail with reference to the following examples and comparative examples. The measurements for evaluation were conducted by the following methods.

(1) Terminal amino concentration (μeq/g)

An amount of polyamide accurately weighed was completely dissolved in a phenol/ethanol=4/1 (by volume) solution at 20 to 30° C. under stirring. The solution thus obtained was subjected to neutralization titration with a 0.1 mol/L hydrochloric acid to determine the terminal amino concentration.

(2) Terminal carboxyl concentration (μeq/g)

An amount of polyamide accurately weighed was completely dissolved in benzyl alcohol in nitrogen atmosphere at 160 to 180° C. under stirring. The solution thus obtained was cooled to 80° C. in nitrogen stream and added with 10 cc of methanol under stirring. The solution thus obtained was subjected to neutralization titration with a 0.1 mol/L aqueous solution of sodium hydroxide to determine the terminal carboxyl concentration.

(3) Gel permeation chromatography (GPC)

A solution of 10 mg of polyamide in 10 g of hexafluoroisopropanol (HFIP) was analyzed by GPC using "Shodex GPC SYSTEM-11" manufactured by Showa Denko K.K.

Measuring Conditions

Measuring column (×2): GPC standard column HFIP-806M manufactured by Showa Denko K.K. (column size: 300×8.0 mm I.D.)

Reference column (×2): HFIP-800

Column temperature: 40° C.

Flow rate: 1.0 mL/min

PMMA was used as the standard sample. The obtained data were processed by SIC-48011 manufactured by Showa Denko K.K. to obtain the number average molecular weight (Mn) and the weight average molecular weight (Mw). The degree of dispersion (Mw/Mn) was calculated from the following equation:

Degree of dispersion=(weight average molecular weight)/(number average molecular weight)

(4) Melting point

Measured in nitrogen stream at a temperature rising speed of 10° C/min using DSC (DSC-50 Type) manufactured by Shimadzu Corporation.

Example 1

Into a jacketed 10-L reaction vessel (pressure resistance: 2.5 MPa) equipped with a stirring device, a partial condenser, a cooler, a dropping vessel, and a nitrogen gas inlet tube, 2.140 kg (10.58 mol) of sebacic acid was charged. After sufficiently purging the reaction vessel with nitrogen, the pressure was raised to 0.3 MPa by nitrogen and the temperature was raised to 160° C. to uniformly melt sebacic acid. Into the reaction vessel, 1.443 kg (10.60 mol) of p-xylylenediamine (boiling point=274° C. under atmospheric pressure) was added dropwise over 170 min while stirring the contents. During the addition, the inner temperature was continuously raised from 160° C. to 283° C. In the dropping step, the pressure was maintained at 0.5 MPa and the water released by condensation was removed from the reaction system through the partial condenser and the cooler. The temperature of the partial condenser was regulated within 148 to 152 ° C. After the dropwise addition of p-xylylenediamine, the pressure was reduced to atmospheric pressure at a rate of 0.2 MPa/h over 120 min. During the pressure fall, the inner temperature rose to 303° C. Thereafter, the reaction was further continued for 30 min under 0.082 MPa. The total reaction time from the start of dropping p-xylylenediamine was 320 min. The solidification and precipitation of oligomer or polyamide were not noticed at all throughout the whole reaction process, and the reaction system was maintained in a uniform molten state from the beginning to end of the reaction. The obtained polymer had:

a terminal amino concentration of 42 (µeq/g), a terminal carboxyl concentration of 81 (µeq/g), a number average molecular weight (Mn) of 14,900 by GPC analysis, a weight average molecular weight (Mw) of 40,900 by GPC analysis, a degree of dispersion (Mw/Mn) of 2.7, and a melting point of 289° C.

Example 2

Into a jacketed 10-L reaction vessel (pressure resistance: 2.5 MPa) equipped with a stirring device, a partial condenser, a cooler, a dropping vessel, and a nitrogen gas inlet tube, 2.140 kg (10.58 mol) of sebacic acid was charged. After sufficiently purging the reaction vessel with nitrogen, the pressure was raised to 0.3 MPa by nitrogen and the temperature was raised to 160° C. to uniformly melt sebacic acid. Into the reaction vessel, 1.443 kg (10.60 mol) of p-xylylenediamine (boiling point=274° C. under atmospheric pressure) was added dropwise over 170 min while stirring the contents. During the addition, the inner temperature was continuously raised from 160° C. to 283° C. In the dropping step, the pressure was maintained at 0.3 MPa and the water released by condensation was removed from the reaction system through the partial condenser and the cooler. The temperature of the partial condenser was regulated within 148 to 152° C. After the dropwise addition of p-xylylenediamine, the pressure was reduced to atmospheric pressure at a rate of 0.15 MPa/h over 120 min. During the temperature fall, the inner temperature rose to 303° C. Thereafter, the reaction was further continued for 30 min under 0.082 MPa. The total reaction time from the start of dropping p-xylylenediamine was 320 min. The solidification and precipitation of oligomer or polyamide were not noticed at all throughout the whole reaction process, and the reaction system was maintained in a uniform molten state from the beginning to end of the reaction. The obtained polymer had:

a terminal amino concentration of 37 (µeq/g), a terminal carboxyl concentration of 94 (µeq/g), a number average molecular weight (Mn) of 14,000 by GPC analysis, a weight average molecular weight (Mw) of 37,600 by GPC analysis, a degree of dispersion (Mw/Mn) of 2.7, and a melting point of 289° C.

Comparative Example 1

Into a jacketed 10-L reaction vessel (pressure resistance: 2.5 MPa) equipped with a stirring device, a partial condenser, a cooler, a dropping vessel, and a nitrogen gas inlet tube, 2.140 kg (10.58 mol) of sebacic acid was charged. After sufficiently purging the reaction vessel with nitrogen, the pressure was raised to 0.3 MPa by nitrogen and the temperature was raised to 160° C. to uniformly melt sebacic acid. Into the reaction vessel, 1.443 kg (10.60 mol) of p-xylylenediamine (boiling point=274° C. under atmospheric pressure) was added dropwise over 170 min while stirring the contents. During the addition, the inner temperature was continuously raised from 160° C. to 283° C. In the dropping step, the pressure was maintained at 0.5 MPa and the water released by condensation was removed from the reaction system through the partial condenser and the cooler. The temperature of the partial condenser was regulated within 148 to 152° C. After the dropwise addition of p-xylylenediamine, the pressure was reduced to atmospheric pressure at a rate of 0.8 MPa/h over 30 min. During the temperature fall, the inner temperature rose to 303° C. Thereafter, the reaction was further continued for 30 min under 0.082 MPa. The total reaction time from the start of dropping p-xylylenediamine was 230 min. The solidification and precipitation of oligomer or polyamide were not noticed throughout the whole reaction process, whereas the increase in the viscosity of the reaction system was also not observed.

Comparative Example 2

Into a jacketed 10-L reaction vessel equipped with a stirring device, a partial condenser, a cooler, a thermometer, a dropping vessel, and a nitrogen gas inlet tube, 4.045 kg (20.00 mol) of sebacic acid, 2.724 kg (20.00 mol) of p-xylylenediamine, and 10 kg of distilled water (charged water) were charged, and the reaction vessel was sufficiently purged with nitrogen. The apparatus was hermetically sealed and the temperature of contents was raised to 230° C. over one hour under stirring. After reaching 2.5 MPa, the charged water and the water released by condensation were distilled out of the apparatus over one hour while maintaining the reaction pressure constant. During the removal of the water, the reaction temperature was raised to 250° C. The reaction pressure was reduced to atmospheric pressure over one hour while continuously distilling off the water. During the pressure fall, the reaction temperature was raised to 290° C. Thereafter, the inner pressure of the reaction system was continuously reduced to 0.08 MPa over 10 min, and then, the reaction was allowed to continue for 20 min, while continuously raising the temperature to 300° C. The time taken after starting to raise the temperature of p-xylylenediamine was 510 min. The solidification and precipitation of oligomer or polyamide were not noticed at all throughout the whole reaction process, and the reaction system was maintained in a uniform molten state from the beginning to end of the reaction. The obtained polymer had:

a terminal amino concentration of 72 (μeq/g),
a terminal carboxyl concentration of 92 (μeq/g),
a number average molecular weight (Mn) of 13,200 by GPC analysis,
a weight average molecular weight (Mw) of 75,400 by GPC analysis,
a degree of dispersion (Mw/Mn) of 5.7, and
a melting point of 287° C.

Industrial Applicability

By the method of the invention, the problems in the known methods of producing polyamide under pressure are solved, and polyamide is directly produced from a dicarboxylic acid and a diamine under pressure while completely omitting the use of a solvent, such as water. The technical advantages, such as the reduction of reaction time, the saving of energy required for distilling off water used as a solvent, the increased amount of charge and increased yield, and the production of polyamide with a small molecular weight dispersion, are simultaneously achieved in the present invention.

What is claimed is:

1. A method of producing polyamide by a direct polycondensation of a diamine component and a dicarboxylic acid component, which comprises:
    adding a diamine component comprising 70 mol % or more of p-xylylenediamine to a dicarboxylic acid component comprising 70 mol % or more of straight-chain aliphatic dicarboxylic acid having 6 to 18 carbon atoms which is maintained in a molten state by heating to a melting point thereof or higher while maintaining a reaction mixture in a molten state under pressure; and
    reducing a pressure of the reaction system to atmospheric pressure over 50 min or longer at a pressure falling speed of 0.2 MPa/h or less after the addition of the diamine component.

2. The method according to claim 1, wherein the diamine component is added continuously or intermittently, and the reaction mixture is maintained in the molten state by regulating a temperature of the reaction mixture within a range from a melting point of the reaction mixture to the melting point +20° C.

3. The method according to claim 1, wherein the pressure falling speed is 0.1 to 0.2 MPa/h.

4. The method according to claim 1, wherein the straight-chain aliphatic dicarboxylic acid having 6 to 18 carbon atoms is sebacic acid.

5. The method according to claim 1, wherein the addition of the diamine component is started after the pressure of the reaction system is regulated to 0.1 to 0.6 MPa.

6. The method according to claim 1, wherein the addition of the diamine component is started after the pressure of the reaction system is regulated to 0.2 to 0.5 MPa.

7. The method according to claim 5, wherein the pressure of the reaction system during the addition of the diamine component is more than 0.1 MPa but not more than 0.6 MPa.

8. The method according to claim 1, wherein the time taken for the addition of the diamine component is 0.5 to 5 hours.

9. The method according to claim 8, wherein said reducing is initiated within 30 min after the completion of the addition of the diamine component.

10. The method according to claim 9, wherein the pressure of the reaction system during the addition of the diamine component is more than 0.1 MPa but not more than 0.6 MPa.

11. The method according to claim 10, wherein the addition of the diamine component is started after the pressure of the reaction system is regulated to 0.1 to 0.6 MPa.

12. The method according to claim 11, wherein the time taken from the completion of the addition of the diamine component to the time when the pressure reaches atmospheric pressure is 50 to 100 min.

13. The method according to claim 1, wherein the time taken from the completion of the addition of the diamine component to the time when the pressure reaches atmospheric pressure is 50 to 100 min.

14. The method according to claim 12, wherein the pressure falling speed is 0.1 to 0.2 MPa/h.

15. The method according to claim 13, wherein the pressure falling speed is 0.1 to 0.2 MPa/h.

16. The method according to claim 1, wherein the diamine component comprises 90 mol % or more of said p-xylylenediamine and the dicarboxylic acid component comprises 90 mol % or more of said straight-chain aliphatic dicarboxylic acid having 6 to 18 carbon atoms.

17. The method according to claim 14, wherein the diamine component comprises 90 mol % or more of said p-xylylenediamine and the dicarboxylic acid component comprises 90 mol % or more of said straight-chain aliphatic dicarboxylic acid having 6 to 18 carbon atoms.

* * * * *